US009999950B1

(12) United States Patent
Vogt et al.

(10) Patent No.: US 9,999,950 B1
(45) Date of Patent: Jun. 19, 2018

(54) FUSELAGE STUFFING BUILDING AND FEEDER LINES

(71) Applicants: Bill V. Vogt, Bellevue, WA (US); Katherine S. Vogt, Kirkland, WA (US); Yuanxin Charles Hu, Newcastle, WA (US); Gabriel A. Burnett, Newcastle, WA (US); Donald K. Stull, Lake Stevens, WA (US)

(72) Inventors: Bill V. Vogt, Bellevue, WA (US); Katherine S. Vogt, Kirkland, WA (US); Yuanxin Charles Hu, Newcastle, WA (US); Gabriel A. Burnett, Newcastle, WA (US); Donald K. Stull, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 1115 days.

(21) Appl. No.: 13/936,657

(22) Filed: Jul. 8, 2013

(51) Int. Cl.
*B23P 19/04* (2006.01)

(52) U.S. Cl.
CPC .................................... *B23P 19/04* (2013.01)

(58) Field of Classification Search
CPC ..... B23P 19/04; B23P 21/004; B23P 2700/01; Y10T 29/49622; Y10T 29/49829; Y10T 29/53365; Y10T 29/53565; Y10T 29/53548; Y10T 29/53543
See application file for complete search history.

(56) References Cited

U.S. PATENT DOCUMENTS

| | | | | | |
|---|---|---|---|---|---|
| 2,337,101 | A | * | 12/1943 | Harris | B63B 9/00 114/65 R |
| 2,383,225 | A | * | 8/1945 | Sorensen | B64F 5/0009 29/281.1 |
| 2,391,510 | A | * | 12/1945 | Pioch | B25H 1/00 105/177 |
| 2,757,447 | A | * | 8/1956 | Barenyi | B62D 65/18 29/430 |
| 3,225,434 | A | * | 12/1965 | Van Der Lely | E04B 1/34815 29/430 |
| 5,371,679 | A | * | 12/1994 | Abe | B23Q 7/1426 29/429 |
| 2003/0131464 | A1 | * | 7/2003 | Yagaki | B23Q 7/06 29/429 |
| 2006/0108470 | A1 | * | 5/2006 | McCrary | B62D 55/062 244/50 |

* cited by examiner

*Primary Examiner* — Christopher M Koehler
(74) *Attorney, Agent, or Firm* — Yee & Associates, P.C.

(57) ABSTRACT

Methods and means for reconfiguring an aircraft assembly plant that receives fuselages or fuselage sections via a public railroad system. In cases where the aircraft assembly plant comprises a first assembly line for installing (i.e., stuffing) equipment inside fuselages or fuselage sections and a second assembly line for installing equipment on exteriors of internally equipped fuselages or fuselage sections, both assembly lines being housed in the same building, the facility can be reconfigured by moving at least one fuselage stuffing operation of the first assembly line to an auxiliary building which overlies a railroad track connected to the public railroad system. The moved fuselage stuffing operations will be performed inside the auxiliary building while each fuselage or fuselage section is supported in an upright position on a respective railroad flat car.

6 Claims, 6 Drawing Sheets

FUSELAGE STUFFING BUILDING AND FEEDER LINES

BACKGROUND

This disclosure generally relates to optimization of aircraft assembly line operations.

The basic principle of a lean production system is to manufacture in the most economical way possible. This is accomplished by focusing on meeting customer requirements, such as determining production time. One of the elements of lean production is producing to takt time. Takt time is the rate in time that a plant maintains to meet customer demand. For example, in aircraft manufacturing, aircraft are assembled on a line, and are moved on to the next station after a certain time, i.e., the takt time. The time to complete work on each station has to be less than the takt time in order for the product to be completed within the allotted time. The takt time concept aims to match the pace of production with customer demand and the net available work time available. Takt time is commonly used in assembly lines that move a product along a line of stations that each perform a set of predefined tasks.

In accordance with a known method of assembling an aircraft, a fuselage is first equipped with internal components at respective work stations of a first assembly line and then is equipped with external components at respective work stations of a second assembly line that is downstream from the first assembly line. (Alternatively, the first and second assembly lines may be respective portions of a single assembly line.) It is known to set up the first and second assembly lines in one building. In the alternative, a single building may house multiple assembly lines for installing internal components and multiple assembly lines for installing external components. In general, a single building may house M assembly lines for installing internal components and N assembly lines for installing external components, where M and N are positive integers that are not necessarily equal.

The operations whereby internal components, such as wires, plumbing, seats, storage bins, carpets, stairs, galleys, closets, etc., are installed inside a fuselage are sometimes referred to as "fuselage stuffing". During fuselage stuffing operations, the inventory of internal components awaiting installation is stored next to the assembly lines for installing internal components. This inventory occupies valuable floor space next to those lines, and causes the assembly lines for installing external components to move slower than need be, because there is more work to do on the upstream assembly lines for installing internal components.

It would be desirable to reconfigure such aircraft assembly facilities in a manner that enables an increase in the rate at which aircraft are assembled (i.e., a decrease in the takt rate).

SUMMARY

The subject matter disclosed herein is directed to methods and means for reconfiguring an aircraft assembly plant that receives fuselages or fuselage sections via a public railroad system. In cases where the aircraft assembly plant comprises a first assembly line for installing equipment inside fuselages or fuselage sections and a second assembly line for installing equipment on exteriors of internally equipped fuselages or fuselage sections, both assembly lines being housed in the same building, the facility can be reconfigured by moving at least one fuselage stuffing operation of the first assembly line to an auxiliary building which overlies a railroad track connected to the public railroad system. The moved fuselage stuffing operations will be performed inside the auxiliary building while each fuselage is supported in an upright position on a respective railroad flat car. In some implementations, multiple fuselage-carrying railroad flat cars are hitched together to form a train, which train can be moved in accordance with the takt time to provide the advantages of a pulsing assembly line wherein multiple fuselages or fuselage sections are moved concurrently to respective next work stations of the assembly line inside the auxiliary building.

One aspect of the subject matter disclosed in detail below is a method for assembling an aircraft, comprising the following operations: (a) moving a first railroad flat car to a first work station of an assembly line via railroad tracks of a public transportation system, wherein the first railroad flat car carries a first fuselage or fuselage section; and (b) installing internal components inside the first fuselage or fuselage section while the first railroad flat car is stationary at the first work station of the assembly line. The method may further comprise: (c) moving the first railroad flat car from the first work station to a second work station of the assembly line; and (d) installing internal components inside the first fuselage or fuselage section while the first railroad flat car is stationary at the second work station. If a second railroad flat car carrying a second fuselage or fuselage section is hitched to the first railroad flat car, the second railroad flat car will be moved to the first work station during step (c), in which case the method further comprises installing internal components inside the second fuselage or fuselage section while the second railroad flat car is stationary at the first work station.

In accordance with one alternative implementation, the aircraft assembly method comprises (a) moving a railroad flat car to a first work station of a first assembly line via railroad tracks of a public transportation system, wherein the railroad flat car carries a fuselage or fuselage section; (b) installing internal components inside the fuselage or fuselage section while the railroad flat car is stationary at the first work station of the first assembly line; (c) moving the railroad flat car to a next work station of the first assembly line; (d) installing internal components inside the fuselage or fuselage section while the railroad flat car is stationary at the next work station of the first assembly line; (e) repeating steps (c) and (d) until internal components have been installed at a last work station of the first assembly line; and (f) transferring the fuselage or fuselage section with installed internal components from the railroad flat car to a factory transport vehicle. This method may further comprise: (g) moving the factory transport vehicle to a work station of a second assembly line; and (h) installing external components on the fuselage or fuselage section while the factory transport vehicle is stationary at the work station of the second assembly line.

Another aspect of the disclosed subject matter is an assembly line comprising a railroad track, a first work station disposed alongside a first section of the railroad track, a railroad flat car rollably mounted on the first section of the railroad track, and a fuselage or fuselage section carried by the railroad flat car, wherein the first work station comprises a first set of tools for installing internal components inside the fuselage or fuselage section. This assembly line may further comprise a second work station disposed alongside a second section of the railroad track adjacent to the first section, wherein the second work station comprises a second set of tools for installing internal components inside a fuselage or fuselage section. This assembly further comprises a cradle system mounted on the railroad flat car for supporting the fuselage or fuselage section in an upright position. In accordance with one implementation, when it is time to move the railroad car from one work station to another, a locomotive or other engine rollably mounted to the railroad track can be hitched to the railroad flat car. In accordance with other implementations, the railroad flat car can be pushed or pulled from one work station to another work station by a ground tractor vehicle or fork lift.

A further aspect is a method for reconfiguring an aircraft assembly plant comprising a main building and first and second assembly lines located inside the main building and not comprising railroad tracks, wherein the first assembly line comprises fuselage-stuffing tools for installing equipment inside fuselages or fuselage sections, and the second assembly line comprises tools for installing equipment on exteriors of internally equipped fuselages or fuselage sections, the second assembly line being arranged to receive fuselages or fuselage sections that have been internally equipped on the first assembly line. The method for reconfiguring comprises: erecting an auxiliary building which overlies at least one railroad track; and moving fuselage stuffing tools from a work station of the first assembly line located inside the main building to a work station adjacent to a section of the railroad track located inside the auxiliary building.

Yet another aspect of the disclosed subject matter is an aircraft assembly plant comprising a first building and a first assembly line disposed inside said first building, wherein the first assembly line comprises: a first length of railroad track located inside the first building; and a first plurality of work stations disposed in sequence alongside the first length of railroad track, wherein each work station of the first plurality comprises a respective set of tools for installing internal components inside a fuselage or fuselage section. The aircraft assembly plant may further comprise a second building and a second assembly line disposed inside the second building, wherein the second assembly line comprises a second plurality of work stations which are not disposed alongside any railroad track, wherein at least some work stations of the second plurality comprise tools for installing external components on the fuselage or fuselage section. In accordance with one implementation, the aircraft assembly plant further comprises a second length of railroad track that is connected to the first length of railroad track and extends to a location proximal to the second building, and a third length of railroad track that connects the first length of railroad track to a public transportation system. In addition, the aircraft assembly plant may further comprise: a train comprising a plurality of railroad flat cars rollably mounted on the first length of railroad track and disposed at respective work stations of the first plurality of work stations; and a plurality of cradle systems respectively mounted on the plurality of railroad flat cars, wherein each of the cradle systems is designed to support a fuselage or fuselage section in an upright position.

Other aspects are disclosed in detail and claimed below.

BRIEF DESCRIPTION OF THE DRAWINGS

Reference will hereinafter be made to the drawings in which similar elements in different drawings bear the same reference numerals.

DETAILED DESCRIPTION

Figure 1:
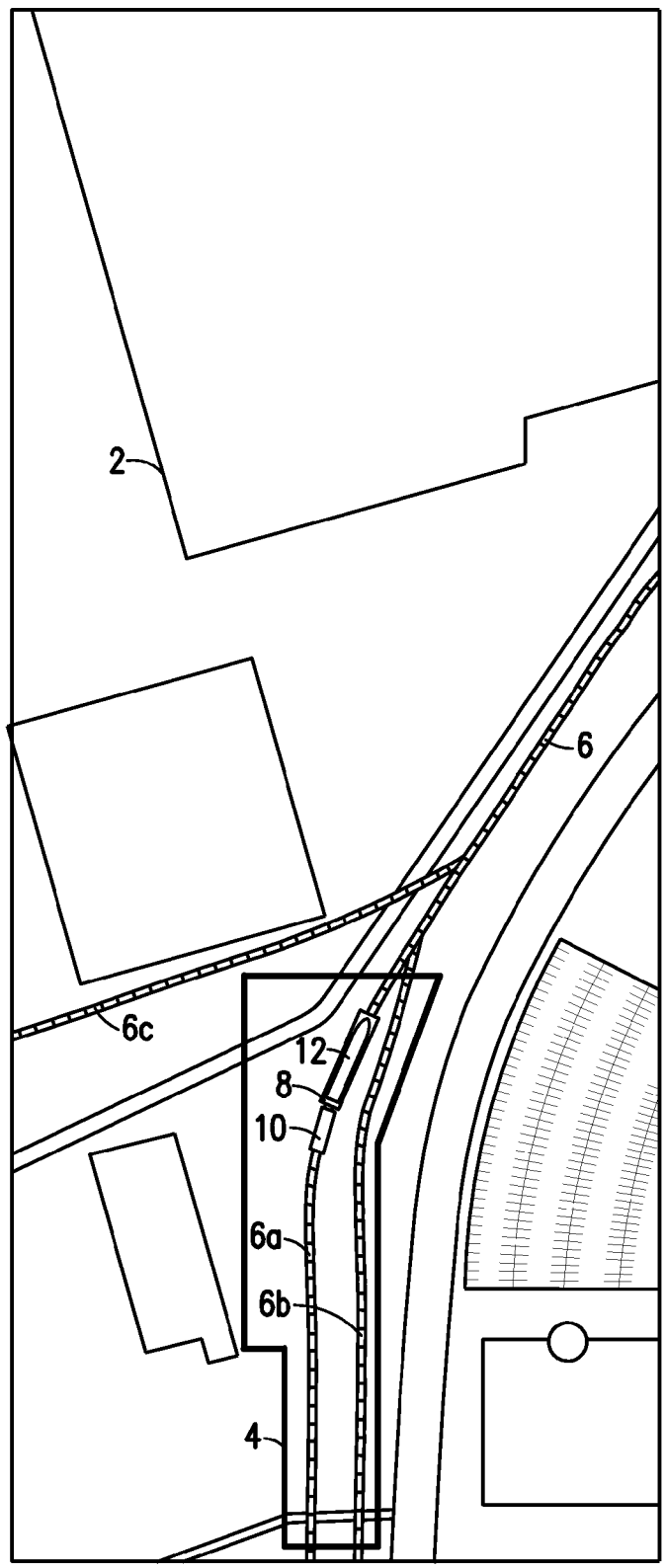
FIG. 1 is a diagram representing a plan view of an area adjacent to and including a portion of an aircraft assembly plant. The seven-sided geometric boundary depicted in bold lines represents the outline of an auxiliary building to be erected over railroad tracking.

FIG. 1 represents a plan view of an area adjacent to and including a portion of an aircraft assembly plant that receives fuselages via a public railroad system. The outline indicated by reference numeral 2 represents a portion of a main building of the aircraft assembly plant. The aircraft assembly plant 2 receives fuselages via railroad track 6 and either of two railroad tracks 6a, 6b which merge at railroad track 6 and connect to the public railroad system (not shown). Railroad track 6c, which also connects to railroad track 6, leads to a dead end proximal to another building (not shown).

In the example depicted in FIG. 1, the main building 2 houses a multiplicity of assembly lines for installing equipment in and on fuselages which have been fabricated at a fuselage fabrication facility located at another site. The fuselages (e.g., fuselage 12 depicted in FIG. 1) arrive on railroad flat cars (e.g., railroad flat car 8 depicted in FIG. 1) via either railroad track 6a or railroad track 6b. FIG. 1 depicts a situation where a railroad flat car 8 is being pushed along railroad track 6a by a small railroad locomotive 10 toward the main building 2, where each fuselage 12 will be transferred to a respective factory transport vehicle (not shown in FIG. 1, but see FIG. 5). Fuselages 12 are moved into, within and out of the main building 2 by means of the factory transport vehicles. Although not shown, railroad track 6 approaches but does not enter the main building 2.

In the example depicted in FIG. 1, the main building 2 houses a multiplicity of assembly lines, but no railroad tracks or portions thereof. The multiplicity of assembly lines housed inside the main building 2 includes at least one assembly line comprising tools for installing equipment inside fuselages and at least one assembly line comprising tools for installing equipment on exteriors of fuselages. The assembly lines for installing external components are arranged to receive fuselages that have been internally equipped on the assembly lines for installing internal components. In some instances, the time it takes one assembly line to install the internal components may be longer than the time it takes another assembly line to install the external components. In that event, the assembly lines for installing internal components will have the effect of slowing the production rate of the assembly lines for installing external components. In addition, the inventory of internal components are stored in the vicinities of the respective work stations of the assembly lines for installing internal components, occupying valuable floor space that might otherwise be used to install external components on fuselages.

To improve the production rate, the assembly operations of the aircraft assembly plant can be reconfigured by erecting an auxiliary building which overlies at least one railroad track and moving fuselage stuffing tools from one or more work stations of the first assembly line inside the main building 2 to corresponding work stations inside the auxiliary building. In accordance with one implementation depicted in FIG. 1, the auxiliary building 4 has the outline indicated by a seven-sided polygonal boundary depicted in bold lines. As seen in FIG. 1, the auxiliary building 4 overlies a length of railroad track 6a and a length of railroad track 6b. The railroad tracks 6a and 6b merge at a point outside the auxiliary building.

As previously noted, the railroad tracks 6a and 6b connect to the public railroad system. This means that fuselages which are normally transported from a fuselage fabrication plant to the main building 2 of the aircraft assembly plant can instead be delivered to the auxiliary building 2. The auxiliary building 4 (as will be described in more detail later with reference to FIG. 2) will house a fuselage stuffing assembly line comprising at least one and preferably multiple fuselage stuffing work stations arranged adjacent to and spaced along one or more sections of railroad track inside the auxiliary building 4. Other fuselage stuffing operations can be retained inside the main building 2. In accordance with one implementation, all fuselage stuffing operations are performed inside the auxiliary building 4 and none are performed inside the main building 2.

After the stuffing operations have been completed for a particular fuselage 12, the railroad flat car 8 on railroad track 6a (see FIG. 1) that carries the fuselage 12 can be pushed (or pulled) by a small railroad locomotive 10, which moves the railroad flat car 8 onto railroad track 6 for delivery to the main building 2. In the alternative, a ground vehicle, such as a tractor or a forklift, could be used to pull or push a stuffed fuselage toward main building 2.

Figure 2:
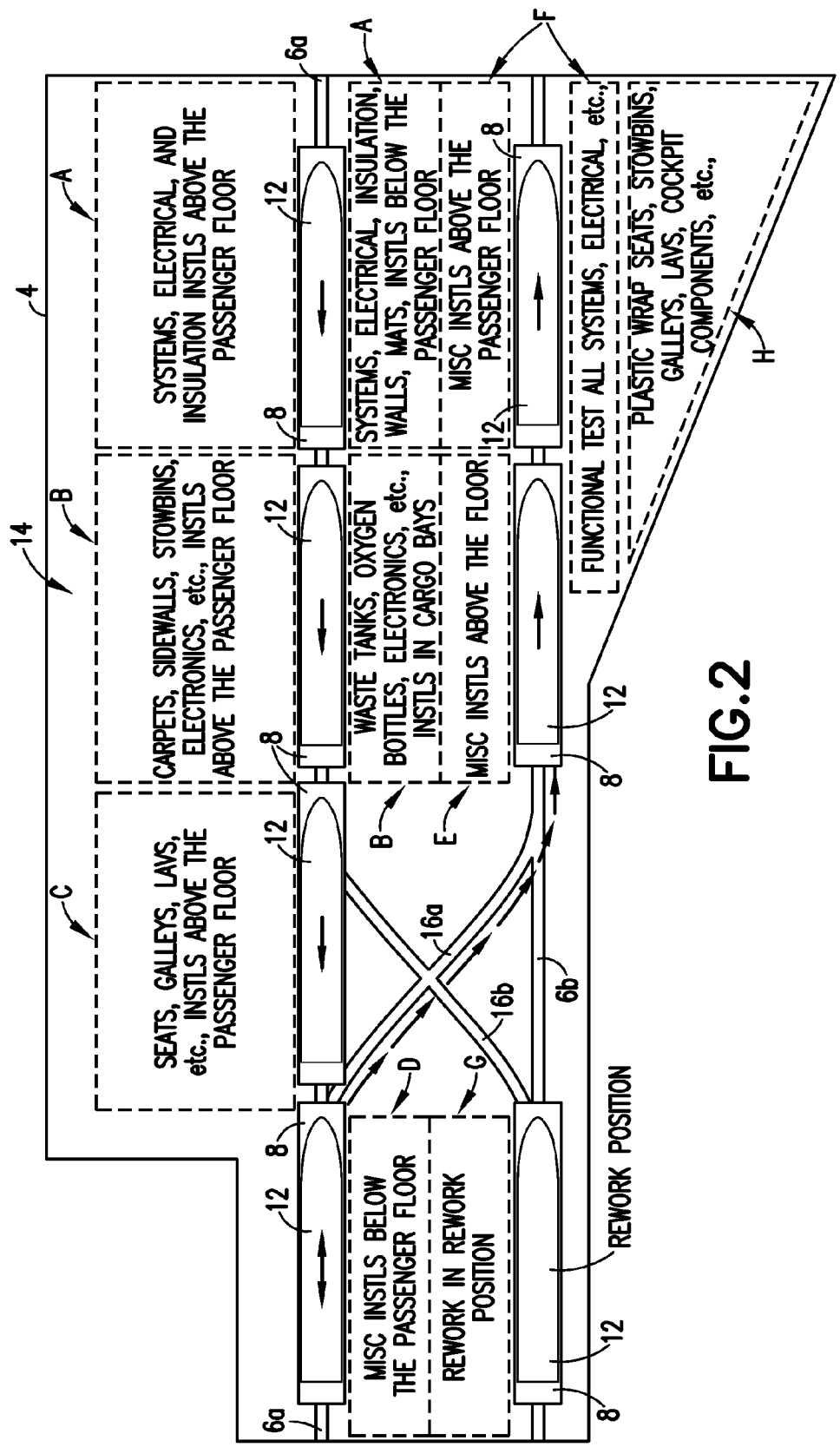
FIG. 2 is a diagram showing a floor plan for an assembly line inside an auxiliary building (overlying railroad tracks) that can be constructed at the site indicated by the seven-sided geometric boundary shown in FIG. 1. The dotted arrows represent flow of internal components; the solid arrows represent the flow of fuselages carried on railroad flat cars which roll on railroad tracks inside the auxiliary building.

FIG. 2 shows a floor plan for an assembly line 14 to be setup inside the auxiliary building 4 in accordance with one implementation. The assembly line 14 comprises: a length of railroad track 6a; a first plurality of work stations A-D disposed in sequence alongside railroad track 6a; a length of railroad track 6b which runs parallel to railroad track 6A; and a second plurality of work stations E, F and G disposed alongside railroad track 6b. Each of work stations A through F of the assembly line 14 comprises a respective set of tools for installing a respective set of internal components inside a fuselage. The mutually parallel lengths of tracks 6a and 6b are connected by a pair of shunting tracks 16a and 16b which allow a railroad flat car 8 to be switched from one of railroad tracks 6a and 6b to the other.

In accordance with the arrangement depicted in FIG. 1, each fuselage will be moved from one work station to the next work station (indicated by arrows in FIG. 2) in the following sequence: A→B→C→D→E→F. A chain of arrows in FIG. 2 indicates the path that would be traveled by a railroad flat car at work station D were it to be unhitched from the train and shunted to work station E by way of shunting line 16a.

At work station A, the fuselage stuffing operations may include installation of systems, electrical components, and insulation above and below the passenger floor as well as installation of walls and mats below the passenger floor. At work station B, the fuselage stuffing operations may include installation of carpets, sidewalls, stowbins, electronics, etc. above the passenger floor as well as installation of waste tanks, oxygen bottles, electronics, etc. in the cargo bays. At work station C, the fuselage stuffing operations may include installation of seats, galleys, lavatories, etc. above the passenger floor. At work station D, miscellaneous internal aircraft components may be installed below the passenger floor. Other miscellaneous internal components can be installed above the passenger floor at work stations E and F. In addition, functional testing of systems, electrical components, etc. is conducted at workstation F. If after functional testing, or at any other point in the assembly process, it is determined that rework is to be done, the fuselage requiring rework is moved to work station G. If a fuselage located at work station B is scheduled to be moved to work station G for rework, the railroad flat car carrying that fuselage can be unhitched from the train and shunted from railroad track 6a to railroad track 6b via shunting line 16b.

The internal components can be delivered to the respective work stations in accordance with just-in-time production techniques in order to reduce in-process inventory. In-process inventory can be stored in storage area H seen in FIG. 2.

Figure 3:
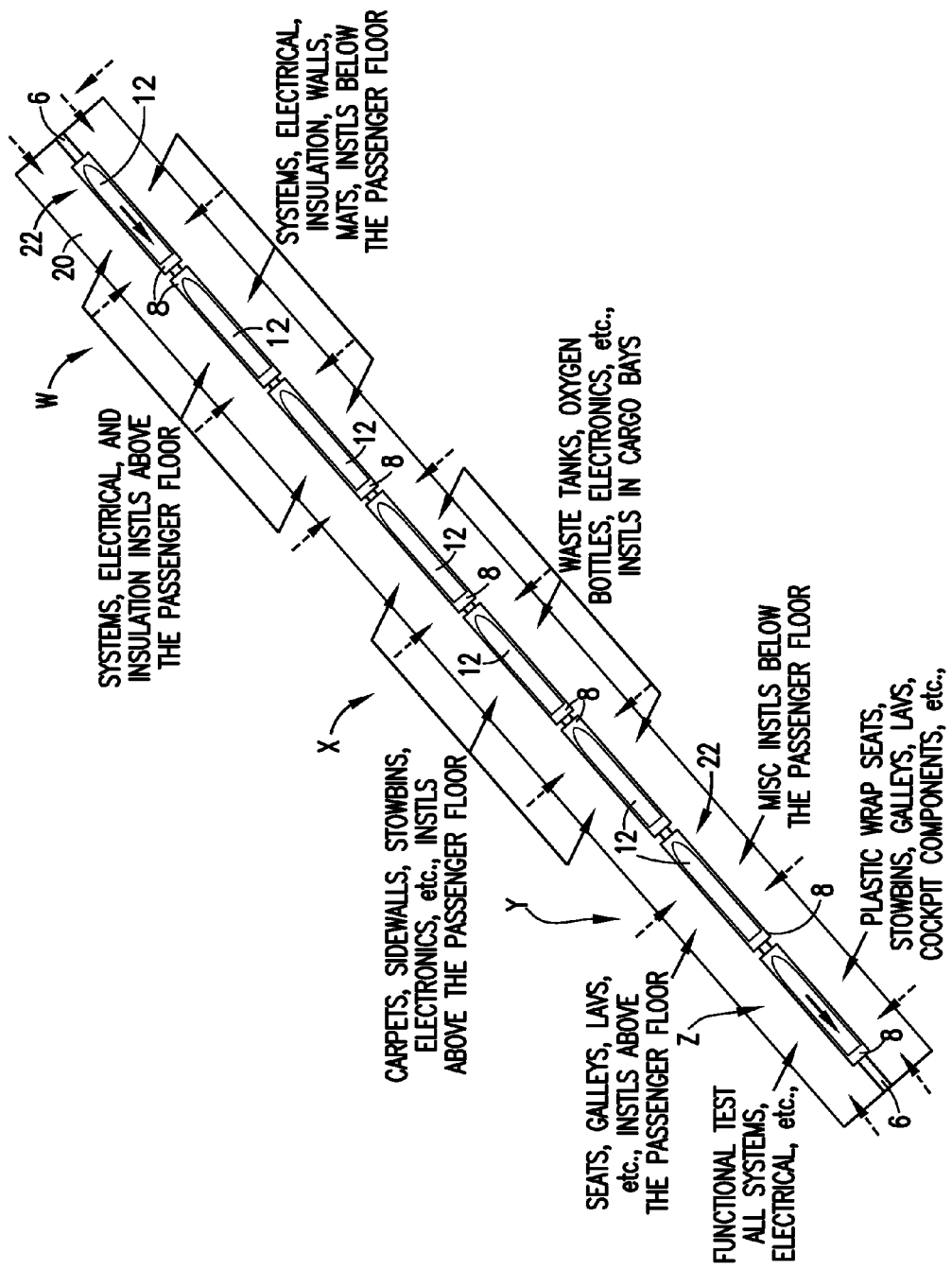
FIG. 3 is a diagram showing a floor plan for an assembly line inside an auxiliary building overlying a single railroad track. The dotted arrows represent flow of internal components; the solid arrows represent the flow of fuselages when the railroad flat cars are moved.

FIG. 3 shows a floor plan for an assembly line inside an auxiliary building 20 overlying a single railroad track 6 in accordance with an alternative implementation. A multiplicity of railroad flat cars 8, each carrying a respective fuselage 12 (or a fuselage section), are hitched together to form a train. The dotted arrows represent flow of internal components into the auxiliary building 20. The solid arrows indicate the installation of internal components inside the fuselages 12. In the implementation of FIG. 2, the fuselage stuffing assembly line was arranged such that different categories of internal components were installed at respective work stations and there is one fuselage 12 at each work station. In contrast, FIG. 3 shows a fuselage stuffing assembly line arranged such that multiple fuselages can be stuffed at one work station. For example, at work station W, three fuselages can be stuffed with systems, electrical components and insulation above their passenger floors and passenger floors and systems, electrical components, insulation, walls and mats below their passenger floors. Similarly, at work station X, three fuselages can be stuffed with carpets, sidewalls, stowbins, electronics, etc. above the passenger floor and waste tanks, oxygen bottles, electronics, etc. in the cargo bays. At work station Y, the fuselage stuffing operations may include installation of seats, galleys, lavatories, etc. above the passenger floor and miscellaneous installations below the passenger floor of one fuselage 12. In addition, functional testing of systems, electrical components, etc. is conducted at workstation Z of assembly line 22.

The assembly line 22 depicted in FIG. 3 is ideal for pulsed operation because fuselages 12 move when the train of railroad cars is moved. At each intervals of takt time, the train can advance one length of a railroad flat car. In a pulsed assembly line, the fuselages (or fuselage sections) in the assembly line are moved, or pulsed, to the next respective station at a set time. Using pulse manufacturing, the fuselages can be moved to designated stations on a fixed schedule, allocating resources to stations that start to fall behind. In the pulse line, the tools and parts will be located virtually next to their work stands. Workers will remain at the same stations and will not have to move their tools with them to various fuselages. Moving the fuselages instead of people makes it easier to regulate work. Also, the assembly line can be pulsed in accordance with customer demand, which means that the tasks at any single station can be balanced.

Figure 4:
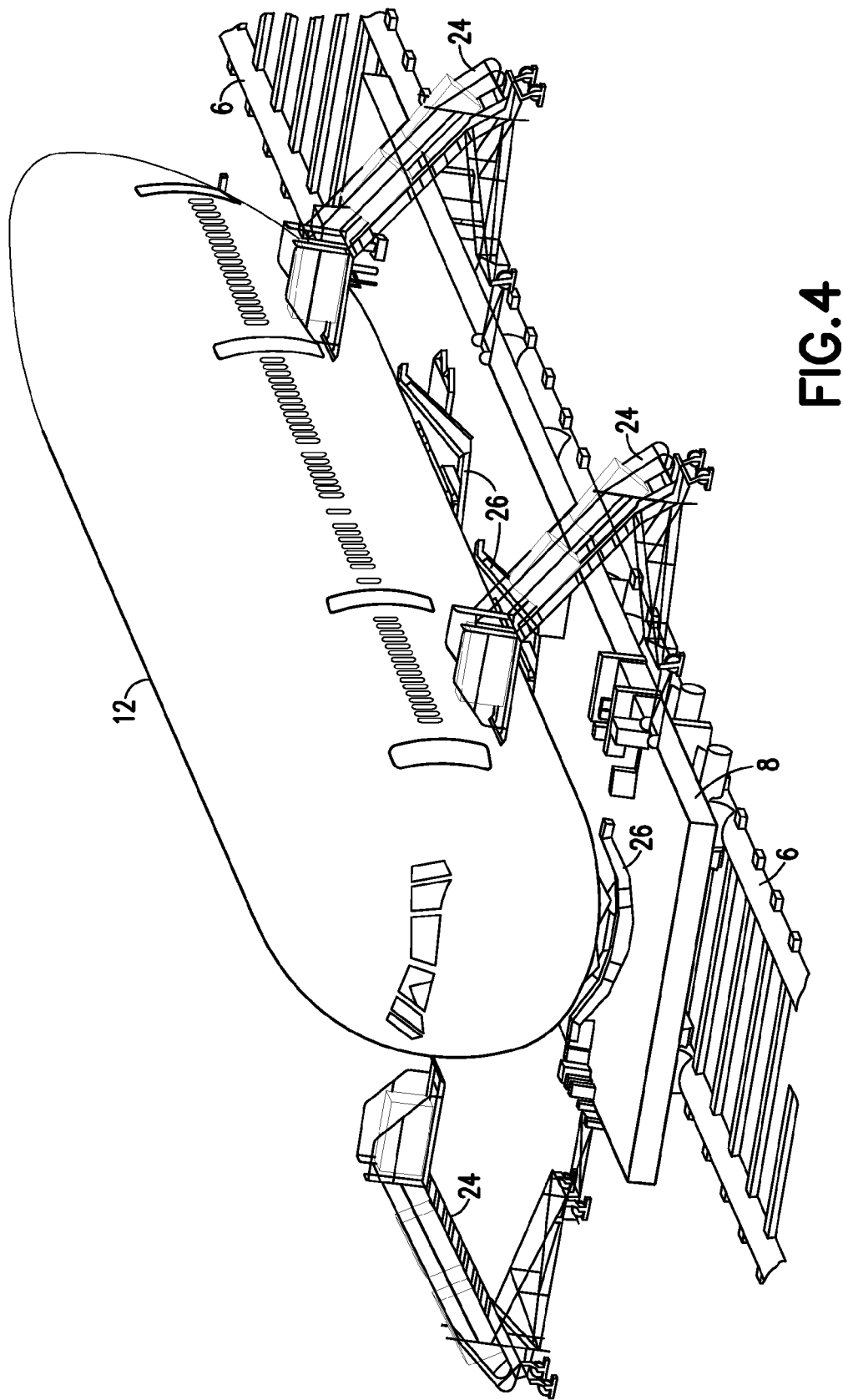
FIG. 4 is a diagram showing an isometric view of a fuselage mounted on a railroad flat car situated at a work station of an assembly line for installing internal components inside the fuselage.

FIG. 4 is a diagram showing an isometric view of a fuselage 12 supported on a railroad flat car 8 by a cradle system 26 comprising a plurality of cradles. The cradles are designed to support the fuselage 12 in an upright position as seen in FIG. 4. The railroad flat car 8 is stationary at a work station of an assembly line for installing internal components inside the fuselage 12. The equipment used for by assembly workers during the fuselage stuffing operations include a plurality of mobile staircases 24.

Figure 5:
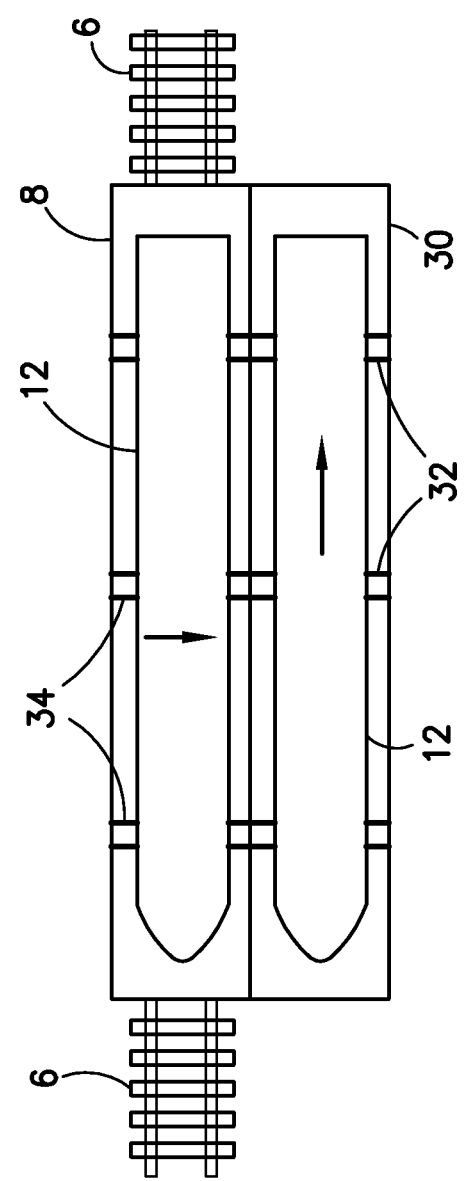
FIG. 5 is a diagram showing the relative positioning of a railroad flat car and a factory transport vehicle during the transfer of a fuselage from the former to the latter.

Referring to FIG. 5, following completion of the fuselage stuffing operations, a fuselage 12 can be transferred from a railroad flat car 8 on a railroad track 6 to a factory transport vehicle 30 parked adjacent to the railroad flat car 8 using cross rails 34 on railroad flat car 8 and cross rails 32 on factory transport vehicle 30. In accordance with this implementation, the cross rails on railroad flat car 8 must be respectively aligned with the cross rails on factory transport vehicle 30. In accordance with an alternative implementation, the fuselage can be transferred from railroad flat car 8 to factory transport vehicle 30 using a bridge crane. The downward-pointing arrow in FIG. 5 indicates the direction of movement of the fuselage 12 during its transfer from railroad flat car 8 to factory transport vehicle 30. After the fuselage 12 has been transferred, the factory transport vehicle 30 can be moved into the main building, as indicated by the arrow directed to the right in FIG. 5.

Figure 6:
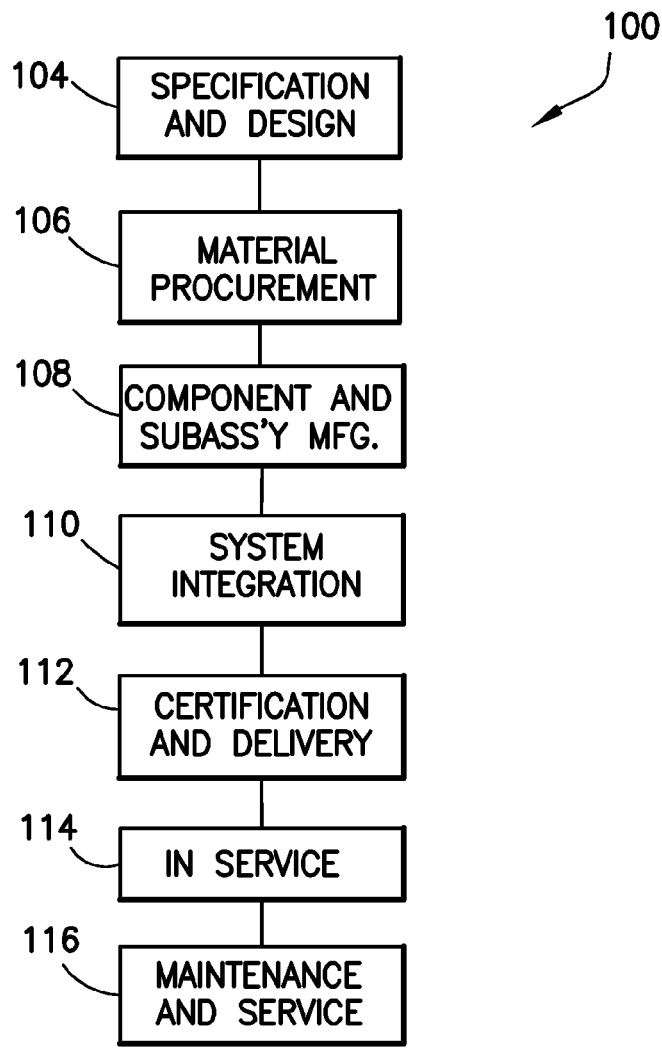
FIG. 6 is a flow diagram of an aircraft production and service methodology.
Figure 7:
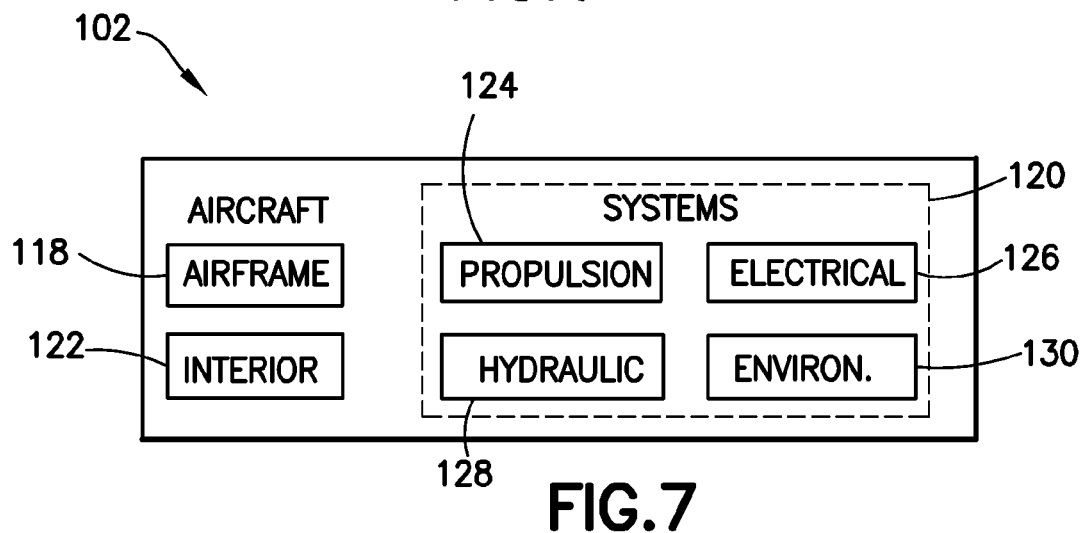
FIG. 7 is a block diagram showing systems of an aircraft.

The system and method disclosed above may be employed in an aircraft manufacturing and service method 100 as shown in FIG. 6 for assembling an aircraft 102 as shown in FIG. 7. During pre-production, exemplary method 100 may include specification and design 104 of the aircraft 102 and material procurement 106. During production, component and subassembly manufacturing 108 and system integration 110 of the aircraft 102 takes place. System integration 110 includes, but is not limited to, the fuselage stuffing operations disclosed herein. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, the aircraft 102 produced by exemplary method 100 may include an airframe 118 (including a fuselage) with a plurality of systems 120 and an interior 122. Examples of high-level systems 120 include one or more of the following: a propulsion system 124, an electrical system 126, a hydraulic system 126, and an environmental control system 130. Any number of other systems may be included. The portions of such systems which reside inside the fuselage may be installed using the fuselage stuffing operations disclosed herein.

One or more apparatus embodiments, method embodiments, or a combination thereof may be utilized during the system integration stage 110 by substantially expediting assembly of or reducing the cost of an aircraft 102.

The above-described aircraft assembly plant reconfiguration plan turns non-productive parking space and side railroad lines into productive factory space, complete with moving lines. This plan makes another use of traditional railroad lines. In accordance with the configuration disclosed above, a traditional railroad line performs two functions: they serve as transportation routes and as moving (or pulsing) production lines. The buildings of the reconfigured aircraft assembly plant can be expanded to accommodate an increased production rate.

While reconfiguration of an aircraft assembly plant has been described with reference to various implementations, it will be understood by those skilled in the art that various changes may be made and equivalents may be substituted for elements thereof without departing from the scope of the teachings herein. In addition, many modifications may be made to adapt the teachings herein to a particular situation without departing from the scope of the appended claims. Therefore it is intended that the claims not be limited to the particular implementations disclosed.

The method claims set forth hereinafter should not be construed to require that the steps recited therein be performed in alphabetical order or in the order in which they are recited. Nor should they be construed to exclude any portions of two or more steps being performed concurrently or alternatingly.

The invention claimed is:

1. A method for assembling an aircraft, comprising the following operations:
    (a) moving a first railroad flat car to a first work station of a first assembly line via railroad tracks of a public transportation system, wherein said first railroad flat car carries a first fuselage or fuselage section; and
    (b) installing internal components inside said first fuselage or fuselage section while said first railroad flat car is stationary at said first work station of said first assembly line and while said first fuselage or fuselage section remains on said first railroad flat car.

2. The method as recited in claim 1, further comprising:
    (c) moving said first railroad flat car from said first work station to a second work station of said first assembly line; and
    (d) installing internal components inside said first fuselage or fuselage section while said first railroad flat car is stationary at said second work station of said first assembly line and while said first fuselage or fuselage section remains on said first railroad flat car.

3. The method as recited in claim 2, wherein a second railroad flat car carrying a second fuselage or fuselage section is hitched to said first railroad flat car, said second railroad flat car being moved to said first work station during step (c), said method further comprising installing internal components inside said second fuselage or fuselage section while said second railroad flat car is stationary at said first work station of said first assembly line and while said second fuselage or fuselage section remains on said second railroad flat car.

4. The method as recited in claim 3, further comprising:
    (e) moving said first and second railroad flat cars from said second and first work stations respectively of said first assembly line to a third and said second work stations respectively of said first assembly line; and (f) installing internal components inside said first and second fuselages or fuselage sections while said first and second railroad flat cars are stationary at said third and second work stations respectively of said first assembly line and while said first and second fuselages or fuselage sections remain on said first and second railroad flat cars respectively.

5. The method as recited in claim 1, further comprising:
(c) moving said first railroad flat car to a next work station of said first assembly line;
(d) installing internal components inside said first fuselage or fuselage section while said first railroad flat car is stationary at said next work station of said first assembly line and while said first fuselage or fuselage section remains on said first railroad flat car;
(e) repeating steps (c) and (d) until internal components have been installed at a last work station of the first assembly line; and
(f) transferring said first fuselage or fuselage section with installed internal components from said first railroad flat car to a factory transport vehicle.

6. The method as recited in claim 5, further comprising:
(g) moving said factory transport vehicle to a work station of a second assembly line; and
(h) installing external components on said first fuselage or fuselage section while said factory transport vehicle is stationary at said work station of said second assembly line and while said first fuselage or fuselage section remains on said factory transport vehicle.

* * * * *